March 3, 1959 L. SKIPWITH, JR 2,875,776
MEANS FOR PREVENTING BACK FLOW
Filed May 7, 1956 2 Sheets-Sheet 1
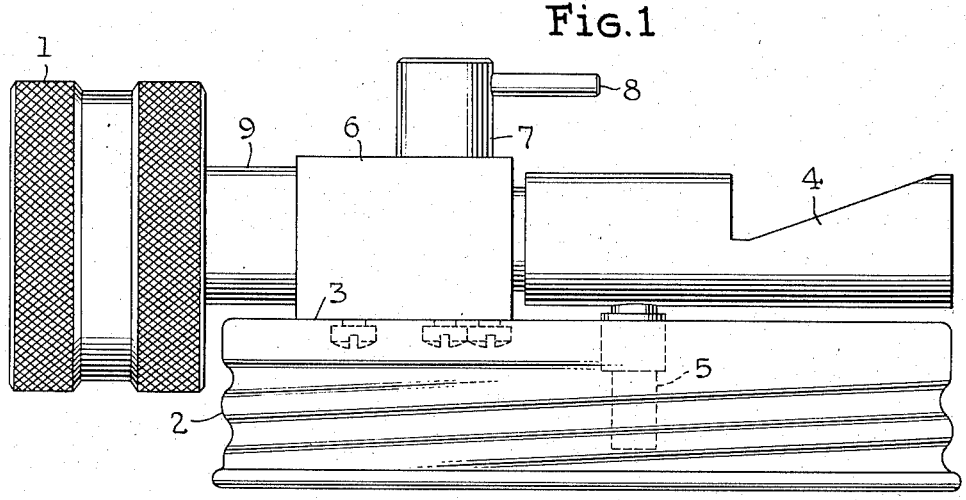
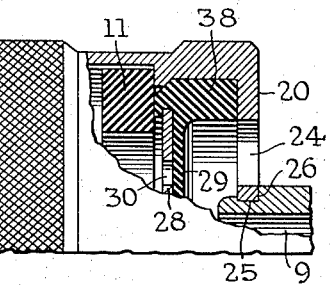
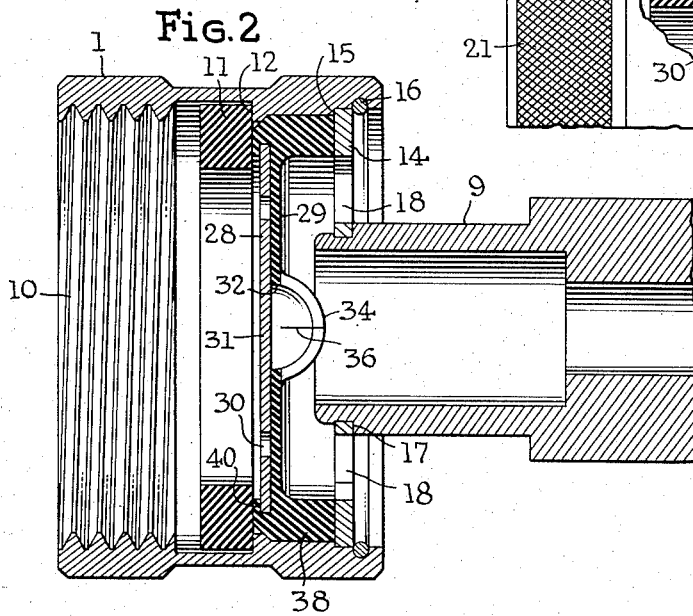

March 3, 1959  L. SKIPWITH, JR  2,875,776
MEANS FOR PREVENTING BACK FLOW
Filed May 7, 1956  2 Sheets-Sheet 2

United States Patent Office 2,875,776
Patented Mar. 3, 1959

2,875,776

MEANS FOR PREVENTING BACK FLOW

Lee Skipwith, Jr., St. Petersburg, Fla.

Application May 7, 1956, Serial No. 583,227

1 Claim. (Cl. 137—218)

The present invention relates to improvements in means for securing unidirectional flow in a feed line, particularly for conducting water into sprayers employed for horticultural, coating, cleaning, and other purposes. More particularly, the invention relates to improved means in a water feed connection for preventing contamination due to back flow in a fresh water supply system.

In the use of chemical sprays, for instance, water is generally led from a fresh water source into a chamber containing a charge of a chemical, and the resulting solution or mixture is projected by means of a spray device onto a surface under treatment. In equipment for this purpose, when ordinary feed connections and valve connections are employed, there is danger of so-called back flow of a spray solution into a water supply system. Various means, termed back flow preventers, have been heretofore suggested and used in different types of apparatus that require connection to a water source.

In the present invention, the parts and features uniquely arranged and combined in the manner described, render it possible to install back flow preventer means conveniently within, if desired, the confines of, for instance, a hose nut of a size suitable for use as a coupling for a standard garden hose. Means are employed that make it possible in a coupling to attach or detach readily a hose or other stream conducting tubing. Also, features are included that make it possible to operate spraying equipment while effectively preventing back flow under conditions of its use. In a spraying operation, a portable type of spray apparatus to which a hose is attached, for example, is subject to being moved about in many different positions while the spray is directed at different angles to reach the surfaces under treatment. Under such conditions, the means provided perform their functions.

Figure 3:
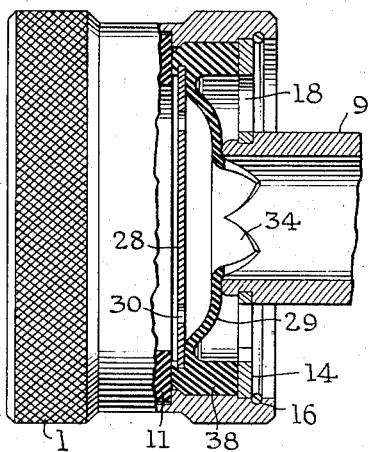
Figure 4:
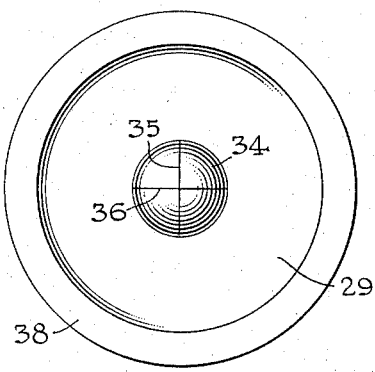
Figure 9:
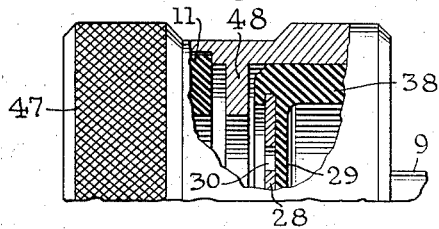
Figure 5:
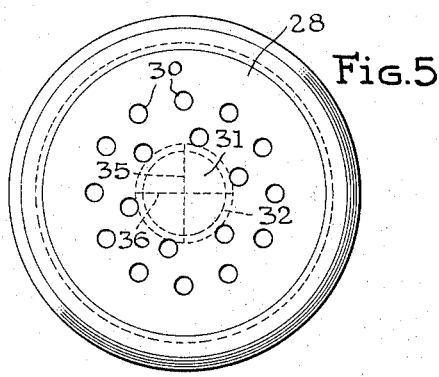
Figure 7:
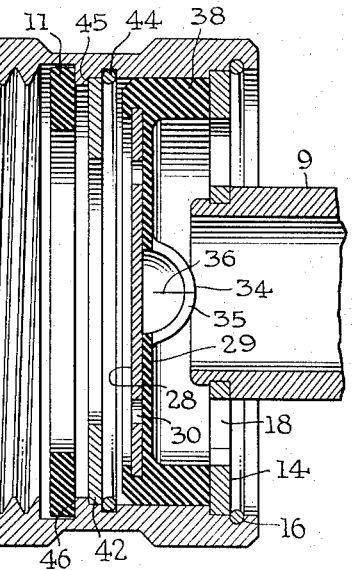
Figure 6:
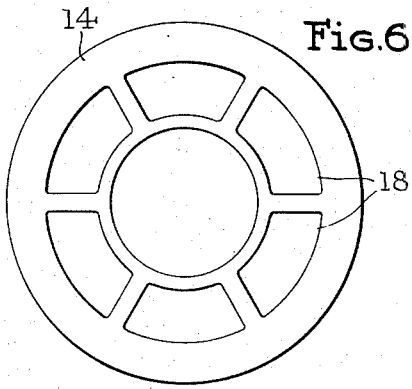

The invention is more completely described and illustrated in connection with the accompanying drawings in which Fig. 1 is a side elevation of a portion of a portable spray apparatus showing the relative position of a hose nut or coupling thereon; Fig. 2 is an enlarged central vertical section through a portion of the apparatus shown in Fig. 1; Fig. 3 is an enlarged view of a part of the apparatus of Fig. 2, partly in section; Figs. 4, 5 and 6 are enlarged plan views of three parts of the hose nut or coupling; Fig. 7 is an enlarged central section through a hose nut or coupling with modifications; Fig. 8 is a side elevation of a fragment, partly in section, of a hose nut with modifications; and Fig. 9 is a side elevation of a fragment, partly in section, of a hose nut also with modifications.

Like reference characters designate like parts in the respective figures of the drawing.

In Fig. 1, which serves to illustrate the application of the invention to a spraying apparatus, a water feed connection such as a hose nut 1 is shown combined with means in a chemical spray unit. The spraying apparatus may be of the type shown and described in application Serial No. 569,347, filed March 5, 1956, comprising a screw cap or cover 2 for a container or glass jar, on the upper surface 3 of which is mounted a spray nozzle 4 connected to an aspirating tube 5 which leads into the supply of liquid to be sprayed; a valve chamber 6 connected to the nozzzle 4 and provided with a rotating valve stem 7 with a handle 8; and a tubular connection 9 serving as a fluid passage between the hose nut or coupling 1 and the valve chamber 6.

In one form, the coupling 1 is a hose nut or adapter comprising a standard, substantially tubular element. Adjacent one end, the inner surface of the tubular element is provided with a screw thread 10 (Fig. 2) to receive the threaded end of a hose or other tubular conductor. A washer 11 of rubber or other suitable material, is positioned adjacent the inner end of the threaded portion and is limited in its movement by an inwardly extending shoulder 12 against which the washer is pressed when the nut is screwed onto the end of a hose, thus forming a water tight seal which prevents leakage through the screw threads.

Adjacent the end opposite the threaded end of the coupling 1 is an annular swivel-plate 14 held in place between a shoulder 15 and a locking ring 16 but permitting rotation of the coupling. The inner edge of the swivel plate 14 is fitted onto the open free end of the tubular connection 9 and is held tightly, or loosely, if desired, against the shoulder 17 by peening the end over to hold the plate rigidly or loosely in position to permit non rotation, or rotation, of the plate, whichever is preferred. The plate 14 is provided with a plurality of openings 18 that serve as air vents or ports for the air break in the operation indicated hereinbelow.

The annular plate 14 not only provides air vents for preventing back flow or siphoning, and further serves to fasten or connect the coupling or hose nut 1 coaxially to the end of the feed passage 9, but also conveniently permits turning of the nut in either direction to screw or unscrew it when in use as a coupling or an adapter. As indicated in a modification (Fig. 8), if desired, a locking ring may be omitted, and the outer edge of the plate 14 may be rigidly joined with the nut 1, or a flange 20 and coupling 21 may be machined as a unit from a single piece of metal. The flange is provided with openings 24 similar to openings 18 (Fig. 2), and the inner edge 25 slides freely between the shoulder 26 and the peened over open free end of the connection or feed passage 9, permitting rotation of the coupling.

Means are provided that serve in a water feed connection and within the confines of a space as small as that provided in a hose nut, to permit flow of fluid in one direction but preventing flow in the opposite direction. Such means includes a rigid plate 28 (Figs. 2 and 5), of metal or other suitable material, positioned transversely in a water passage and laminated with a layer 29 of rubber or other resilient material flatly against an annular perforated portion of the plate. The perforations 30 are arranged uniformly around a central portion 31 of the plate, that is solid and imperforate. The layer 29 is separable from the plate except at its outer edge so that during flow of water through said perforations 30 from the water supply to said spray unit, the layer 29 separates from the plate 28 and the water flows inwardly and past the inner edge 32 of the layer 29. When the water flow is stopped, the layer 29 returns to its position flatly against the plate 28 and prevents the return of water through the perforations 30.

As a further safeguard against back flow, a convexed central portion 34 of the resilient layer 29, that may be termed a teat valve, is preferably attached to the inner edge 32 and spans the central imperforate portion of the plate 28. The teat valve 34 has slits 35 and 36 (Fig. 4) at right angles to each other and cut through the resilient material to form lips that are normally closed. Water flowing through the coupling 1 toward the spray unit, forces the layer 29 against the edge 37 of the connection 9 as in Fig. 3, thus sealing off the air vents or ports 18 and directing the stream through the teat valve 34 which is thereby opened into the connection 9. When the flow is stopped the layer 29 recedes toward the plate 28 whereupon the lips formed by the slits 35 and 36 are drawn tightly together in the valve 34. At the same time, air from the vents 18 becomes accessible to the interior of the connection 9 thus destroying the vacuum or siphoning effect that would otherwise cause the solution from the spray unit to flow back past the coupling 1. The air vents 18, the annular layer 29 of resilient material, and the teat valve 34, all three together serve in a high degree to prevent the contamination of a water supply system caused by back flow.

Back flow preventive means, such as those described above, can be included as a unit in the coupling or hose nut 1 between the plate 14 (Fig. 2) or flange 20 (Fig. 8) and the washer 11. A unit that serves in a highly effective manner for the purpose intended and for insertion in a coupling, comprises a molded form of rubber, or synthetic rubber, which form includes a cylindrical support portion 38 for annular placement against the inner wall of the coupling and that lines the wall of the coupling 1 between the shoulder 12 and the plate 14; and a portion, previously designated as an annular layer 29, and that is a flange integral with the cylindrical portion 38 and extends inwardly therefrom to the convexed central portion that serves as the teat valve 34. The plate 28 has its circular edge lodged in a groove 40 in the inner wall of the cylindrical portion 38 adjacent the flange 29 on the stream-approaching side thereof. The plate 28 in the position shown tends to brace the cylindrical portion 38 of the back flow preventer unit tightly against the wall of the nut 1 particularly while the teat valve 34 and the flange or layer 29 are stretched to their open positions by a moving stream as shown in Fig. 3.

In the modification shown in Fig. 7, the various features of Fig. 2 are included and in addition a metal washer 42 is provided in the nut 43 between the resilient or rubber washer 11 and the back flow preventer unit. The washer 42 is held in place by a locking ring 44 and a shoulder 45, and serves as an added precautionary means for preventing a user from tightening up on the male coupling end of a hose to the extent that the teat valve 34 is opened by forcing the lips apart. When the nut 43 is screwed onto a hose, the washer 11 is forced against the shoulder 46 and against the washer 42, thus sealing against leakage out towards the hose.

As shown in the modification in Fig. 9, a nut 47 for including the features of nut 43 (Fig. 7) may be machined with a flange 48 that takes the place of the washer 42 and locking ring 44 (Fig. 7). If desired, the nut 47 may be machined with a flange similar to the flange 20 (Fig. 8), in which case the flange 48 would be replaced by a washer 42 and locking ring 44 as in Fig. 7.

The invention hereinabove set forth is embodied in particular form and manner but may be variably embodied within the scope of the claim hereinafter made.

What is claimed is:

In a hose nut for coupling a garden hose to a supply passage for introducing water into a chemical spray unit, the said nut having within its confines and held therein by a removable locking ring, the following elements consisting of: an open end of said passage spaced from the inner surface of the side wall of the nut, a rigid disc transversely positioned in said nut having a solid central portion and having perforations in an annular portion out of line with said passage, a layer of resilient material between the said disc and said open end of said passage, spaced from the said open end, laminated with and flatly against the said disc and covering the said perforations during a back flow action, the said layer of resilient material extending inwardly from the edge of the disc separable from the disc except at its outer edge to permit uncovering of said perforations by the flow of water therethrough, the said resilient material having a slitted central portion that extends into and opens into said open end of said passage when said perforations in said disc are uncovered and that thus guides water into said passage, and a removable plate-like means within said hose nut extending across the space between the hose nut and the said passage and having loose connection therewith to permit rotation of the nut to screw it onto or unscrew it from the end of a hose while maintaining the spaced relation between the said open end of said passage and said resilient layer in the laminated position with respect to said disc, the said plate-like means having ports to the atmosphere to provide vacuum breaking means, and the said layer of resilient material when said perforations in said disc are uncovered and upon contacting the end of said passage, preventing flow of water through said ports.

References Cited in the file of this patent

UNITED STATES PATENTS

| | | |
|---|---|---|
| 2,322,631 | Groeniger | June 22, 1943 |
| 2,629,393 | Langdon | Feb. 24, 1953 |
| 2,646,063 | Hayes | July 21, 1953 |
| 2,674,262 | Bradshaw | Apr. 6, 1954 |